Nov. 16, 1937. J. L. GETAZ 2,099,201
ABSORPTION REFRIGERATING MACHINE
Filed Oct. 19, 1935
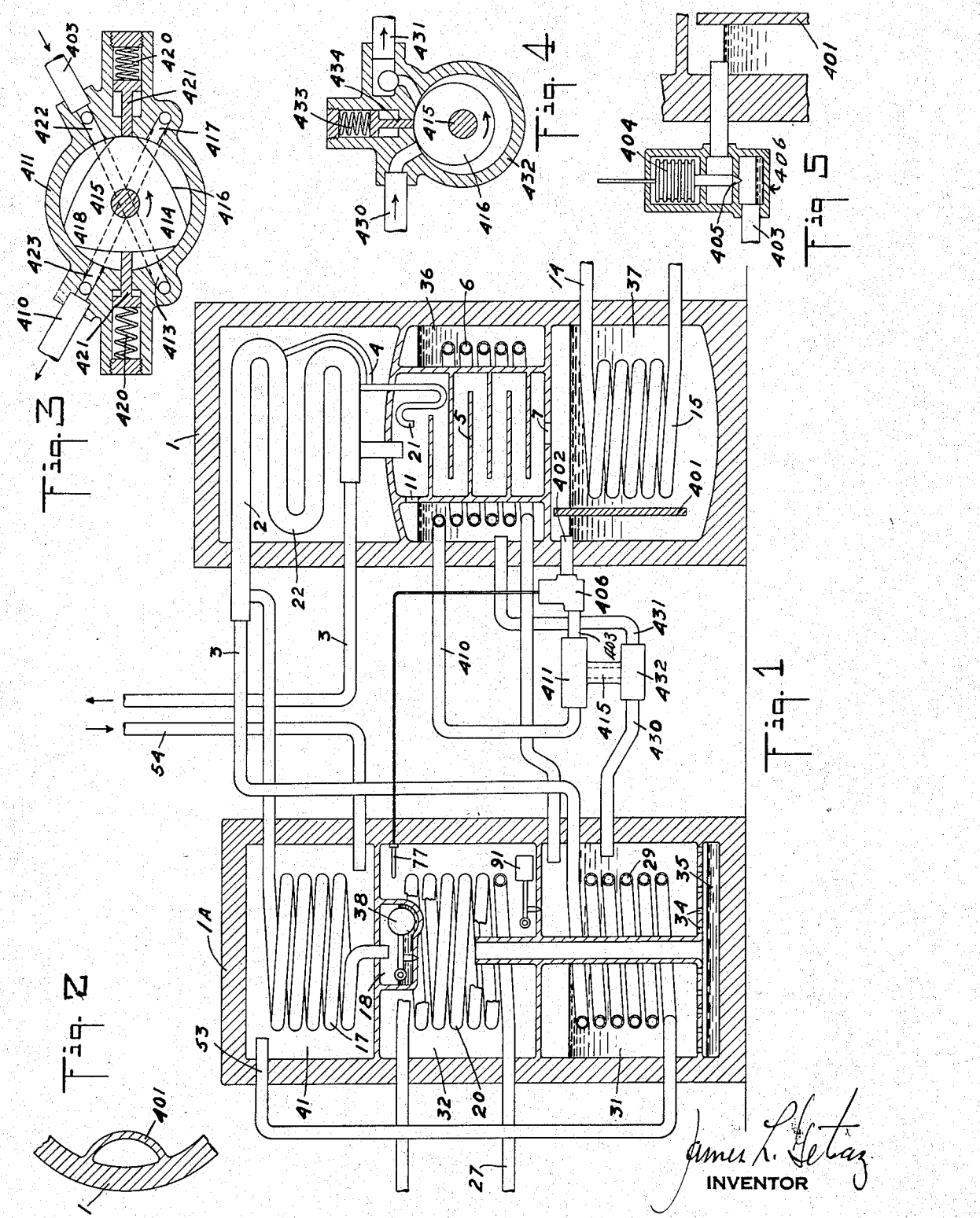
INVENTOR
James L. Getaz
BY
ATTORNEY Patented Nov. 16, 1937

2,099,201

UNITED STATES PATENT OFFICE 2,099,201

ABSORPTION REFRIGERATING MACHINE

James L. Getaz, Maryville, Tenn.

Application October 19, 1935, Serial No. 45,755

12 Claims. (Cl. 62—119)

This invention relates to refrigerating machines of the absorption type, and more particularly to means for circulating the strong and weak liquors between the generator and the absorber. It also provides a means for regulating the height of the liquor in the generator and correspondently the height of liquor in the absorber.

It is the purpose of this invention to provide a means for pumping the strong liquor from the absorber to the generator without the use of an external source of power, and to accomplish this purpose with a maximum of refrigerating capacity.

It is an object of this invention to use the energy stored in the weak liquor under pressure in the generator to pump the strong liquor and to supplement this energy of the weak liquor by using enough ammonia vapor from the generator to provide sufficient power for pumping the strong liquor.

It is also an object of this invention to control the flow of liquor from the generator to the absorber without the use of valves which are ordinarily provided for that purpose.

Fig. 1 is a diagrammatic view of an absorption refrigerating machine;

Fig. 2 is a section showing a detail of the generator;

Fig. 3 is a section through the motor which drives the pump for returning the strong liquor to the generator;

Fig. 4 is a section through the pump mentioned above;

Fig. 5 is a section through the thermostat and regulating valve which controls the operation of the motor shown in Fig. 3.

In Fig. 1 the refrigerating system is shown divided into two parts, the condenser 41, the cooler 32 and the absorber 31 being to the left. The rectifier 22, the analyzer 5, the heat exchanger 36 and the generator 37 are shown at the right.

Steam is supplied to the generator through pipe 14 connected to the coil 15. The system is cooled by water entering through the pipe 54, passing through the condenser 41 and the absorber 31 and the rectifier 22, and being discharged through the pipe 3. Brine is circulated through cooler in coil 20. The condensed ammonia passes from the condensing coil 17 to the chamber 18 and its flow into the cooler 3 is regulated by the float valve 38. The cooler is also provided with a float valve 91 which is so adjusted that it opens when water accumulates in the cooler, and discharges the aqua ammonia in the cooler into the absorber.

In the generator 37 there is shown a partition 401, which is shown in section in Fig. 2. The partition extends above the liquor line in the generator, and is open at the top allowing the ammonia vapor to pass over it. It is also open at the bottom allowing the weak liquor from the bottom of the generator to fill the space between the partition 401 and the side of the generator. At the level of the liquor line in the generator and within the enclosure formed by this partition is an outlet pipe 402. The opening to this pipe 402 is controlled by a thermostat 404 which opens and closes the valve 405 and is regulated by the bulb 77 located in the cooler. The pipe 403 connects the valve 405 to the rotary motor 411, which valve is shown in detail in Fig. 5. Valve 405 controls the flow of weak liquor and ammonia vapor from the generator to the absorber through the rotary motor 411. This valve is enclosed in casing 406 between pipe 402 leading to the generator and pipe 403 connected to the rotary motor.

This rotary motor has a triangular disc 416 rotating on the shaft 415 within a circular enclosure. The supply pipe 403 is connected to two entrance ports 422 and 413, and there are two discharge ports 423 and 417 connected to discharge pipe 410.

Two follower slides 421 press against the surfaces of disc 416, being held in position by springs 420. By this arrangement when vapor or liquid under pressure is admitted to pipe 403 it will rotate the motor in a counterclockwise direction and be discharged through pipe 410 at a lower pressure. The purpose of this arrangement is twofold; one is to provide power for pumping the strong liquor and the other purpose is to maintain a constant level of liquor in the generator and absorber without a float valve. The motor 411 is connected by the shaft 415 to the rotary pump 432 for pumping this liquor. The level of the liquor in the generator cannot rise above the pipe 403 because the capacity of the motor is greater than the capacity of the pump. If the level of the liquor in the generator is lowered so that the liquor does not fill the rotary motor, the remaining space is filled with ammonia vapor. The weak liquor in passing through the rotary motor provides part of the power necessary to pump the strong liquor; the remaining power required is supplied by the ammonia vapor. As the temperature of both the weak liquor and the ammonia vapor is the temperature of the generator, the vapor is not absorbed until the liquor is cooled. The weak liquor passes through the pipe 410, and the coils 6 of the heat exchanger to the absorber 31.

The rotary pump 432 is shown in section in Fig. 3 and is the same as is in ordinary use in refrigerating machines. The strong liquor is drawn from the absorber through pipe 430 and discharged through pipe 431 to the heat exchange 36, and thence through the opening 11 into the analyzer 5.

The rotary motor 411 is constructed with double ports and a triangular disc so that it cannot stop on center, its speed is regulated by the temperature in the cooler so that it may provide a slow continuous circulation of liquor in proportion to the amount of refrigeration desired. It automatically stops when the pressure in the generator is reduced by cutting off steam and starts when this pressure is raised unless cut off by a low temperature in the cooler. In this mechanism the only control needed for the circulation of the liquor is the control of the valve 405 by the temperature in the cooler.

I claim:

1. In an absorption refrigerating machine, a generator, an absorber, a pump for pumping strong liquor from the absorber to the generator, a motor for driving said pump, said motor being driven by the combined action of the weak liquor passing from the generator to the absorber combined with the action of a portion of the ammonia vapor which has been vaporized in said generator.

2. In an absorption refrigerating machine, a generator, an outlet to said generator at the level of the surface of the liquor in said generator, a partition in said generator separating said outlet from the body of the generator, said partition being open at the bottom to admit weak liquor to the outlet and open at the top to admit ammonia vapor to the outlet.

3. In an absorption refrigerating machine, a generator, an outlet to said generator at the level of the surface of the liquor in said generator, means for passing the weak liquor from the bottom of the generator through said outlet.

4. In an absorption refrigerating machine, a generator, an outlet to said generator at the level of the surface of the liquor in said generator, means for passing weak liquor from the bottom of the generator through said outlet and also for passing ammonia vapor from above the surface of the liquor through said outlet.

5. In an absorption refrigerating machine, a generator, an outlet to said generator at the level of the surface of the liquor in said generator, means for passing weak liquor from the bottom of the generator through said outlet as the level of the liquor rises above the bottom of the outlet, so as to automatically keep the height of the liquor in the generator at the level of the outlet.

6. In an absorption refrigerating machine, an absorber, a generator, an outlet to said generator at the level of the surface of the liquor in said generator, a pump for pumping the strong liquor from said absorber to said generator, a motor for driving said pump connected to said outlet, said motor being driven by the combined action of the weak liquor and the ammonia vapor in said generator in passing from said generator to said absorber.

7. In an absorption refrigerating machine, an absorber, a generator, an outlet to said generator at the level of the liquor in said generator, a pump for pumping the strong liquor from said absorber to said generator, a motor for driving said pump, said motor being driven by a supply of weak liquor and ammonia vapor passing through the pump from the generator to the absorber, the level of the liquor in said generator reducing the supply of said ammonia vapor and increasing the supply of weak liquor to said motor, as the level of the liquor in said generator rises above the bottom of said outlet.

8. In an absorption refrigerating machine, an absorber, a generator, an outlet to said generator at the level of the liquor in said generator, a pump for pumping the strong liquor from said absorber to said generator, a motor for driving said pump, said motor being driven by a supply of weak liquor and ammonia vapor passing through the pump from the generator to the absorber, the level of liquor in said generator reducing the supply of said weak liquor and increasing the supply of ammonia vapor to said motor, as the level of the liquor in said generator falls in the opening of said outlet.

9. In an absorption refrigerating machine, a cooler, an absorber, a generator, a pump for pumping the strong liquor from said absorber to said generator, a motor for driving said pump, a supply of weak liquor and ammonia vapor from said generator for driving said motor, automatic regulation of the supply of said weak liquor and ammonia vapor to said motor by the temperature in said cooler.

10. In an absorption refrigerating machine, a cooler, an absorber, a generator, a pump for pumping the strong liquor from said absorber to said generator, a motor for driving said pump, a supply of weak liquor and ammonia vapor from said generator for driving said motor, automatic regulation of the operation of said pump by the temperature in said cooler.

11. In an absorption refrigerating machine, an absorber and a generator, means for utilizing the latent energy in the weak liquor in the generator as it passes to the absorber, for transferring strong liquor from the low pressure in the absorber to the higher pressure in the generator, and means for supplementing the energy of the weak liquor by the energy in a portion of the ammonia vapor in the generator, so as to produce sufficient power for transferring the strong liquor as needed for refrigeration, and means for passing said portion of ammonia vapor directly to the absorber with the weak liquor.

12. In an absorption refrigerating machine, an absorber and a generator, means for utilizing the energy in a portion of the ammonia vapor in the generator for transferring the strong liquor from the low pressure in the absorber to the higher pressure in the generator, and means for utilizing the energy in the weak liquor as it passes from the generator to the absorber in conjunction with the ammonia vapor, so as to use a minimum quantity of ammonia vapor in producing the power necessary to transfer the strong liquor and means for passing said portion of ammonia vapor directly to the absorber with the weak liquor.

JAMES L. GETAZ.